(No Model.) 2 Sheets—Sheet 1.

C. J. VAN DEPOELE, Dec'd.
C. A. COFFIN & A. WAHL, Administrators.
ELECTRIC LOCOMOTIVE.

No. 496,330. Patented Apr. 25, 1893.

Witnesses
H. A. Lawls
Stephen Jannus

Inventor
Charles J. VanDepoele
By Frankland Jannus
Attorney (No Model.) 2 Sheets—Sheet 2.
C. J. VAN DEPOELE, Dec'd.
C. A. COFFIN & A. WAHL, Administrators.
ELECTRIC LOCOMOTIVE.

No. 496,330. Patented Apr. 25, 1893.

Witnesses
H. A. Lamb
Stephen Jammus

Inventor
Charles J. VanDepoele
By
Frankland Jammus
Attorney

UNITED STATES PATENT OFFICE.

CHARLES J. VAN DEPOELE, OF LYNN, MASSACHUSETTS; C. A. COFFIN AND ALBERT WAHL, ADMINISTRATORS OF SAID VAN DEPOELE, DECEASED, ASSIGNORS TO THE THOMSON-HOUSTON ELECTRIC COMPANY, OF BOSTON, MASSACHUSETTS.

ELECTRIC LOCOMOTIVE.

SPECIFICATION forming part of Letters Patent No. 496,330, dated April 25, 1893.

Application filed September 24, 1891. Serial No. 406,740. (No model.)

*To all whom it may concern:*

Be it known that I, CHARLES J. VAN DEPOELE, a citizen of the United States, residing at Lynn, in the county of Essex and State of Massachusetts, have invented certain new and useful Improvements in Electric Motor Suspension, of which the following is a description, reference being had to the accompanying drawings, and to the letters of reference marked thereon.

My invention relates to improvements in electric railway motors and is, in part, an improvement upon the invention set forth in my patent No. 448,562, March 17, 1891, which said patent discloses flexible gear connections between the motor and driving axle of a car truck.

According to my present invention each motor is only connected with one axle and in very many instances a single motor geared to one of the axles of a car truck is found amply sufficient for all purposes. However, it will be understood that any desired number of motors may be connected with the axles of a car truck or that a single motor may be used and the axles connected by flexible gearing, such as sprocket chains or the like.

A motor gear embodying my invention comprises a spring-supported motor, a driving gear flexibly connected with the axle to be driven, and an armature pinion engaging said gear the gear and the armature pinion being held in fixed relation by the frame or parts connected with the frame of the motor and participating in the spring support thereof.

The invention also relates to various details of construction, arrangement and operation, as will appear from the following description, and will be referred to in the appended claims.

Figure 1:
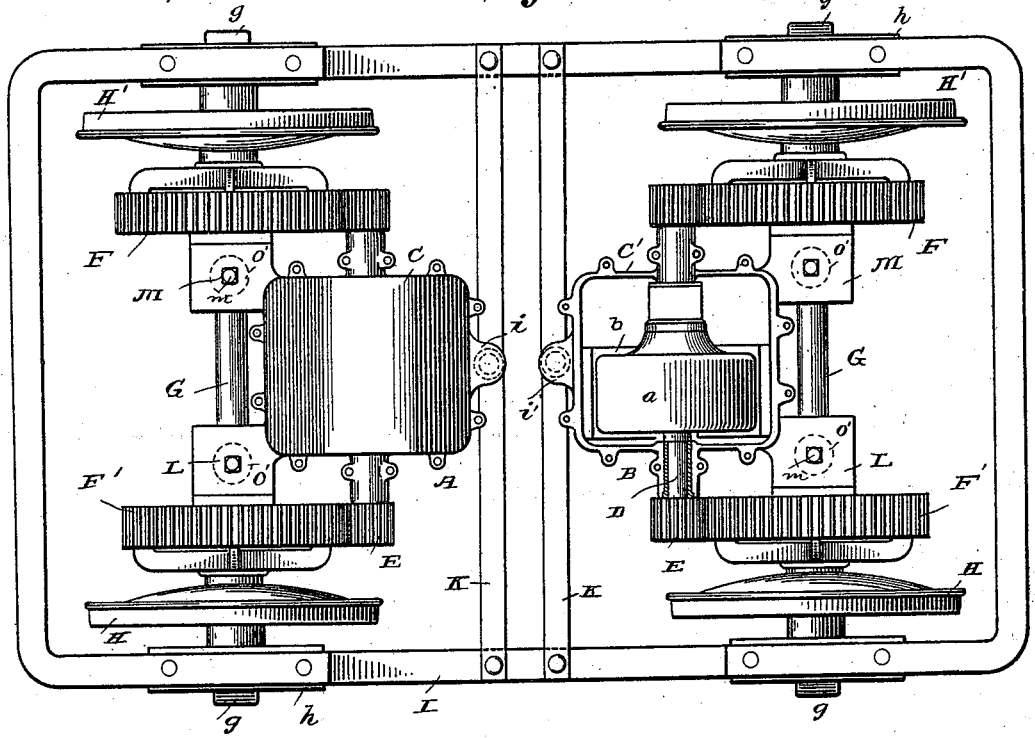
Figure 2:
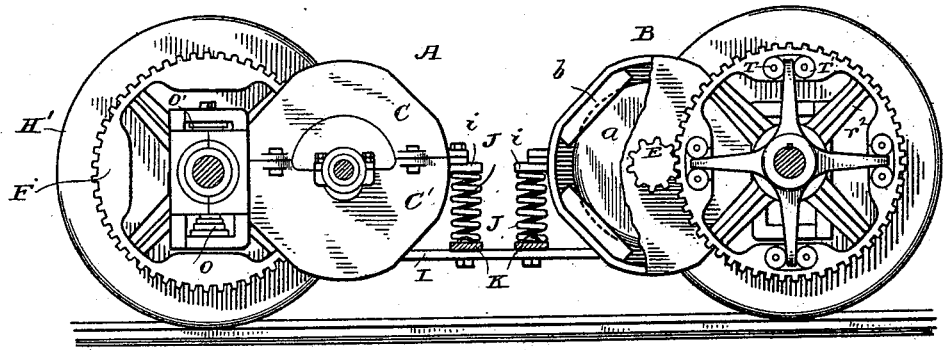
Figure 3:
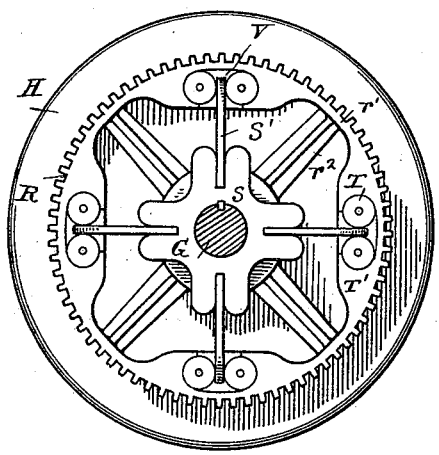
Figure 4:
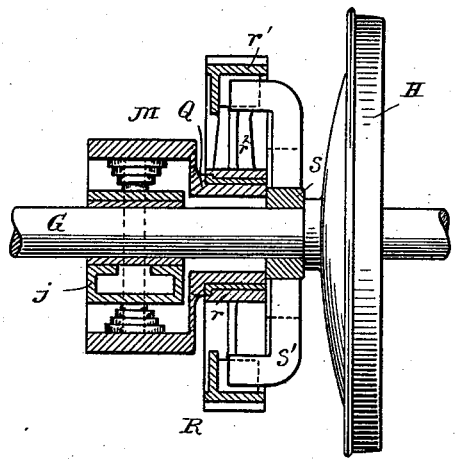
Figure 5:
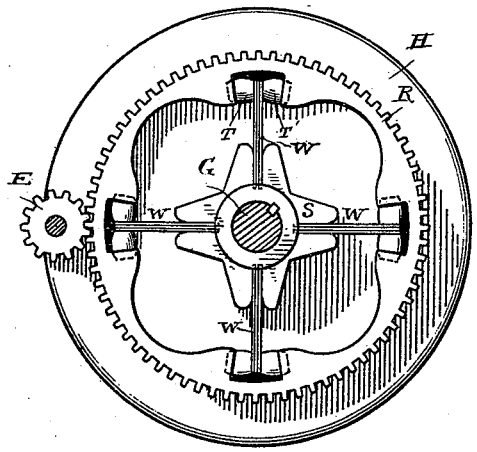
Figure 6:
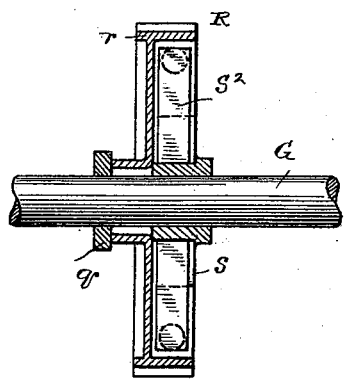

In the accompanying drawings—Figure 1 is a top plan view of an electric railway motor truck embodying the invention. Fig. 2 is a side view of a motor truck some of the parts being removed for clearness of illustration. Fig. 3 is a view in elevation showing the relations between the dynamometric driving gear, the axle, and carrying wheel. Fig. 4 is an end view of the parts seen in Fig. 3, with portions in vertical sectional elevation. Fig. 5 is a view similar to Fig. 3, embodying a slightly modified arrangement. Fig. 6 is a detail showing the gear wheel of Fig. 5 partly in sectional elevation, together with the axle to be driven.

In the drawings, A, B, represent electric motors which may be of any desirable type; as here indicated, however, the field magnets have four polar extensions between which rotates a suitable armature. Further, the pole pieces of the motors are in the shape of interiorly projecting parts integral with or attached to an exterior iron casing comprising upper and lower sections C, C'. Each armature $a$, is mounted upon a suitable shaft D, which carries a pinion E. As indicated in Fig. 1, the armature shafts D, may carry a pinion at each end for the purpose of engaging the driving gears F, F', which are mounted upon the axle G, to be driven, as will appear. The axle G, is the ordinary car axle and upon it are secured the carrying wheels H, H', which may be of the usual pattern since, according to the present invention, they need not necessarily be modified in any manner. The ends of the axle G, are carried in journal boxes $g$, moving between pedestals $h$, and united by the usual iron frame I.

The front end of each motor is provided with a projecting nose-piece $i$, and each nose-piece rests upon or is connected with a spring which spring is sustained by a cross bar K. The noses $i$, preferably project from the lower and larger section C', of the motor casing, thus leaving the upper portion in position to be movable for inspection or repair of the motor without removing the same from its operative position or displacing any of the moving parts.

The rear end of each motor is sustained by what I have called a carrying frame which comprises boxes L, M, which may or may not be connected detachably with the rear end of the lower part C', of the casing, although I prefer to cast them integral therewith. The boxes are formed in two parts which are fitted over the axle and then secured together. Oil boxes j, are fitted upon the axle and between the oil boxes and the boxes L, M, of the carrying frame, are interposed buffer springs O, O'. The carrying frame is bolted securely to the rear end of the motor which is then spring-supported at each end, by the springs J, at one end, and by the spring boxes L, M, upon the axles at the other. It will be observed, therefore, that the motor is capable of vertical motion but cannot move laterally. Each one of the boxes L, M, is provided with an extension in the form of a sleeve Q, of sufficient diameter to be free from the axle, and also not to impede the vertical movement of the rear end of the motor. This movement, however, will not ordinarily be much more than enough to absorb vibration, although greater or less provision for such movement may be made as desired.

It will be understood that the motor moves vertically upon its springs and it will also appear that, being suspended at three points, said vertical movement will not disturb the parallelism which should exist between the armature shaft and the axle to be driven. The springs within the boxes L, M, may be adjusted to sustain more or less of the weight of the motor by means of suitable set screws m, passing through said boxes and in engagement with the springs.

As indicated in Fig. 4, the difference in the internal diameter of the extension Q, and the circumference of the axle G, is a space allowing of spring movement of the motor, at which point said spring movement, together with the vibration, is lost. The power of the motor is transmitted to the axle G, and thence to the carrying wheels by an elastic gear wheel R, which is mounted upon the extension Q, of the motor frame and has yielding connection with the axle G. A convenient form of construction comprises a hub S, which is rigidly secured to the axle to be driven or to the adjacent carrying wheel. This is for standard constructions; it will be obviously convenient, however, to form these hubs integral with the carrying wheels.

The hubs S, are seen in Figs. 3 and 5, and are provided with radial arms which are desirably of resilient metal. The arms S', in Fig. 3, are indicated as being solid pieces whereas the arms $S^2$, of Fig. 5, are constructed of leaf springs. This, however, is a mere detail. The ends of the arms S', $S^2$, carried by the hub S, extend between springs T, T', which are carried in suitable pockets V, in the rim of the gear R. A section of the gear R, is indicated in Fig. 4, and comprises a hub r, rim r', the hub and the rim being connected by spokes $r^2$.

The hub and arms which are secured to the driving axle, may be made integral and the flexibility of the connections be secured entirely by the cushions or springs carried by the gear wheel R.

Figs. 5 and 6 illustrate a slight modification of the hereinbefore described construction, in which resilient arms consisting of a number of flat springs W, are seated in slots in the hub S, and extend radially, their outer ends being held between spring bumpers or cushions T, T', as in the previous instance, thus giving a flexible connection between the driving and driven parts. The central portion or hub of the gear R, of Figs. 5 and 6, is larger than the axle G, so that there may be relative movement between them, said gear R, is, however, additionally supported and is prevented from wabbling by an elastic packing q, which is fitted between or about the parts and serves as a buffer between the central opening in the gear R, and the axle G.

Various modifications may be made in the invention as set forth and the parts may be somewhat differently constructed or disposed without departing from the invention.

Having described my invention, what I claim, and desire to secure by Letters Patent, is—

1. The combination with an axle to be driven, of an electric motor vertically spring-supported at one end upon the said axle, a resilient support for the opposite end of said motor, a driving pinion or pinions upon the armature shaft, a flexible connection rotatively mounted with respect to the axle, a part fixed to the axle and engaging the flexible connection, and intermediate gear between the armature shaft and the said rotatively mounted flexible connection.

2. The combination with an axle to be driven, of an electric motor vertically spring-supported at one end upon the said axle, a resilient support for the opposite end of said motor, a driving pinion or pinions upon the armature shaft, a flexible connection rotatively mounted with respect to the axle, a part fixed to the axle and engaging the flexible connection, and intermediate gear between the armature shaft and the said rotatively mounted flexible connection.

3. The combination with an axle to be driven, of an electric motor vertically spring-supported at one end upon the said axle, a resilient support for the opposite end of said motor, a driving pinion or pinions upon the armature shaft, a flexible connection rotatively mounted upon a sleeve upon the axle, a part fixed to the axle and engaging the flexible connection, and intermediate gear between the armature shaft and the said rotatively mounted flexible connection.

4. The combination with an axle to be driven, of an electric motor supported upon the axle by a spring bearing box, an extension upon said bearing box forming a sleeve upon the axle, a resilient support for the opposite end of said motor, a driving pinion or pinions upon the armature shaft, a gear wheel rotatively mounted upon the extension of the bearing box, and a part fixed to the axle and engaging a flexible connection, between the axle and the said rotatively-mounted gear wheel.

In testimony whereof I affix my signature in presence of two witnesses.

CHARLES J. VAN DEPOELE.

Witnesses:
JOHN W. GIBBONEY,
STEPHEN JANNUS.